Figure 1:
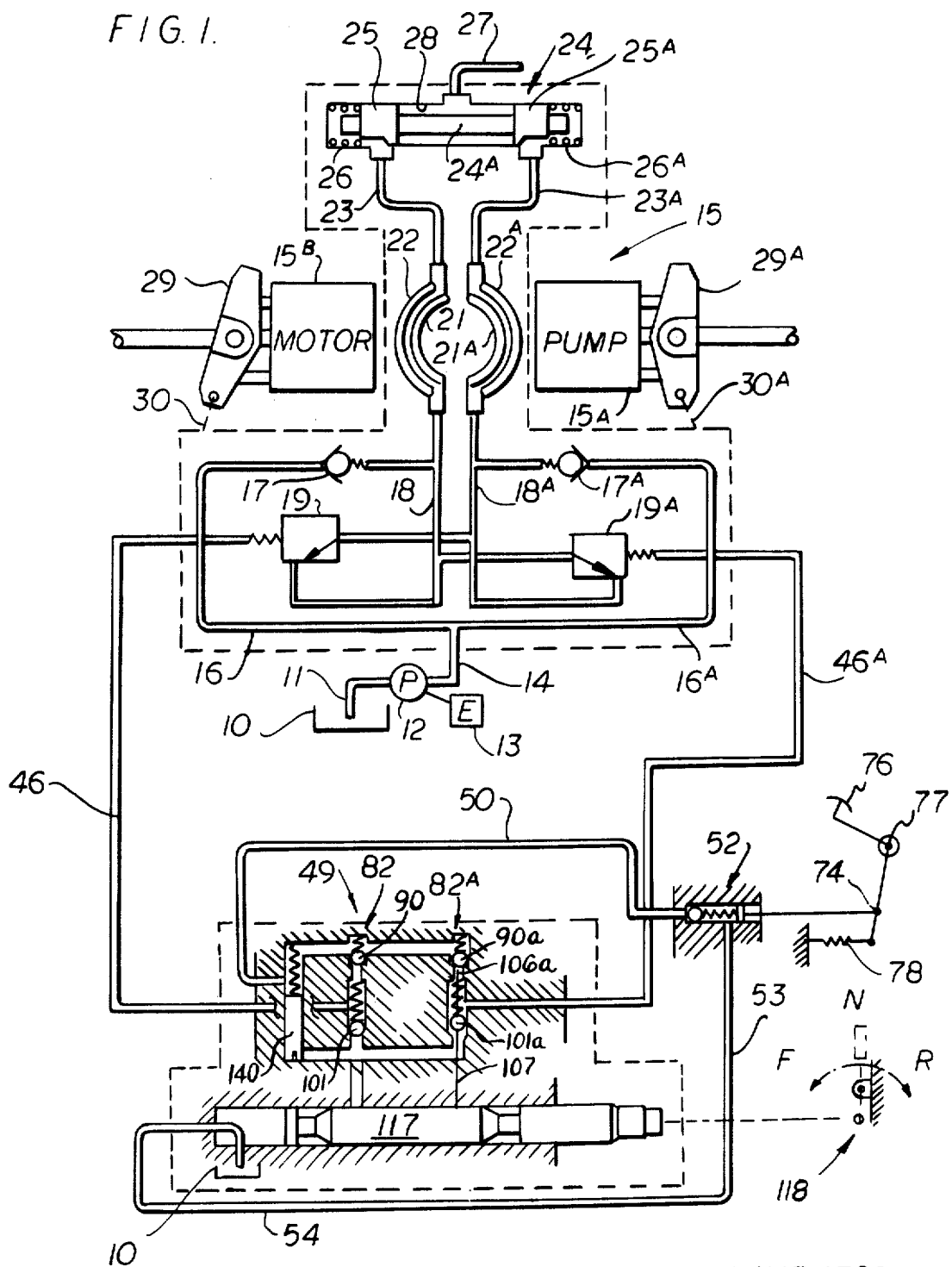

United States Patent
Asmus

[15] 3,675,421
[45] July 11, 1972

[54] LOW EFFORT SHUTTLE BLOCK SELECTOR SPOOL MODIFICATION FOR THE MANUAL FEATHERING CONTROL AND OVERSPEED CONTROL FOR A HYDROSTATIC TRANSMISSION

[72] Inventor: Rodger W. Asmus, Downers Grove, Ill.
[73] Assignee: International Harvester Company, Chicago, Ill.
[22] Filed: Nov. 5, 1970
[21] Appl. No.: 87,317

Related U.S. Application Data

[63] Continuation of Ser. No. 14,725, Feb. 24, 1970, abandoned, which is a continuation of Ser. No. 731,472, May 23, 1968, abandoned.

[52] U.S. Cl. ........................................... 60/53 R, 60/53 A
[51] Int. Cl. ........................................................ F16d 31/02
[58] Field of Search ................ 60/53 R, 53 A, 19; 180/66

[56] References Cited

UNITED STATES PATENTS

| | | | |
|---|---|---|---|
| 2,465,758 | 3/1949 | Sedgwick et al. | 60/52 HF |
| 2,789,542 | 4/1957 | Vander Kaay | 60/53 R X |
| 2,961,829 | 11/1960 | Weisenbach | 60/53 R |
| 3,126,707 | 3/1964 | Hann et al. | 60/53 A |
| 3,153,900 | 10/1964 | Pigeroulet et al. | 60/53 R X |
| 3,199,286 | 8/1965 | Anderson | 60/53 R X |
| 3,217,493 | 11/1965 | Kempson et al. | 60/53 R |
| 3,383,857 | 5/1968 | Rajchel et al. | 60/53 A |
| 3,393,509 | 7/1968 | Kempson | 60/53 R |
| 3,398,530 | 8/1968 | Prevallet et al. | 60/53 A |
| 3,398,531 | 8/1968 | Swanson et al. | 60/53 A |
| 3,424,260 | 1/1969 | Stone et al. | 60/53 R X |

*Primary Examiner*—Edgar W. Geoghegan
*Attorney*—Noel G. Artman

[57] ABSTRACT

A hydraulic control system for a hydrostatic transmission in which are provided valving means which can be selectively positioned corresponding to forward, neutral or reverse drive of the transmission and including means for dumping excess fluid pressure from the fluid pressure circuit in order to prevent damage to the transmission and under certain conditions to prevent overspeeding of the transmission to further prevent damage. Means are provided whereby fluid flow in the hydrostatic loop can be by-passed from its normal drive path in the transmission, through the valve means provided.

24 Claims, 2 Drawing Figures

INVENTOR
RODGER W. ASMUS
ATT'Y

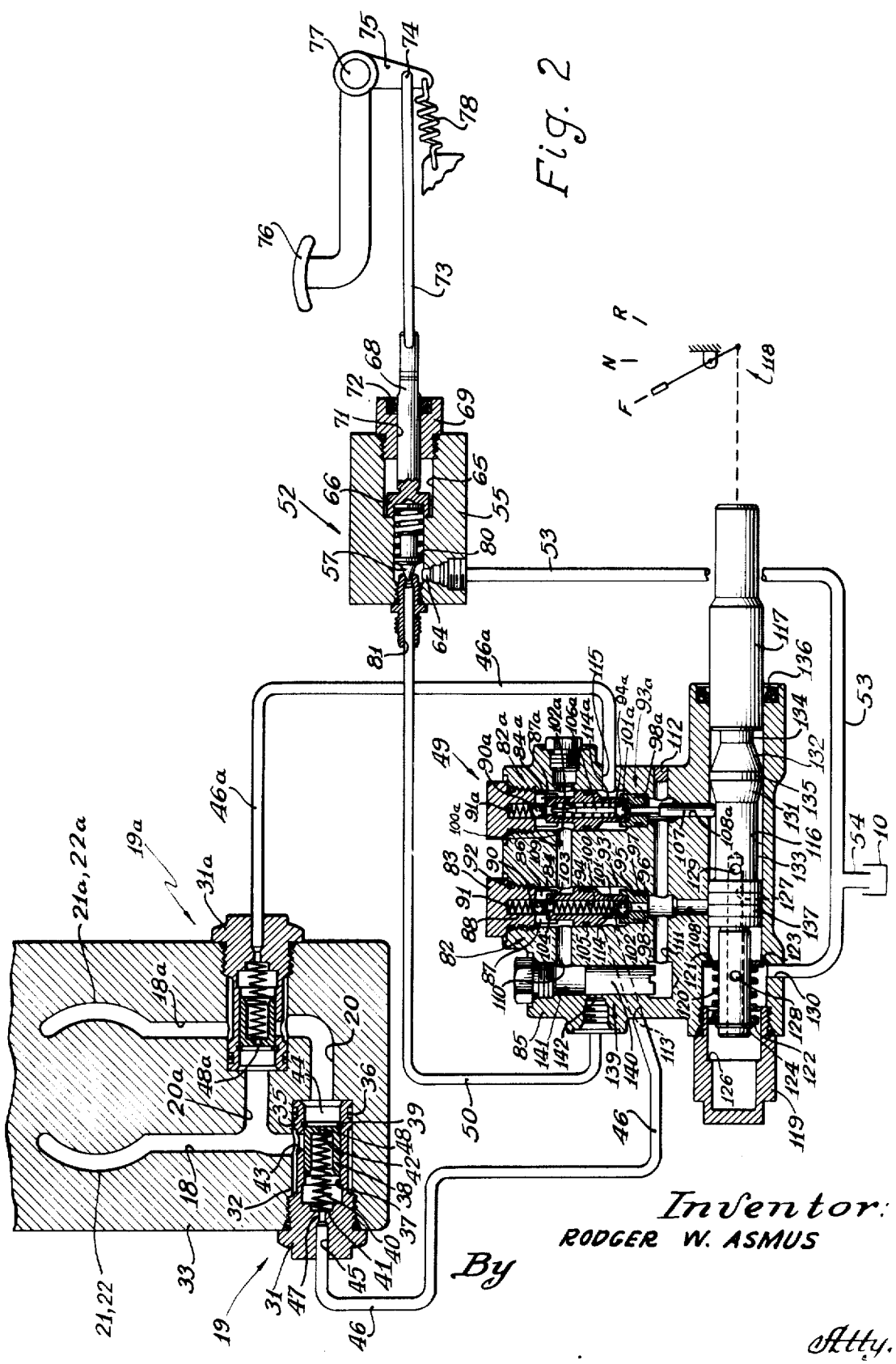

3,675,421

LOW EFFORT SHUTTLE BLOCK SELECTOR SPOOL MODIFICATION FOR THE MANUAL FEATHERING CONTROL AND OVERSPEED CONTROL FOR A HYDROSTATIC TRANSMISSION

This application is a streamlined continuation of Ser. No. 14,725, filed Feb. 24, 1970 which was a streamlined continuation of Ser. No. 731,472, filed May 23, 1968, both now abandoned.

BACKGROUND OF THE INVENTION

This invention relates to hydrostatic transmissions but more particularly to control means for preventing over-speeding and additionally providing feathering control of a transmission of this type when incorporated in a vehicle.

It is well known that hydrostatic transmissions are frequently employed in the power train for transmitting drive between the engine and propulsion wheels of a vehicle. However, despite the increasing use of hydrostatic transmissions in vehicles such arrangements continue to encounter drawbacks and objectionable characteristics. One of the difficulties in such transmissions is the accidental overspeeding of such transmissions when, for instance, the vehicle is propelled by the force of gravity, or the weight of the vehicle and any load being carried or towed by the vehicle down an incline. In such cases the momentum sometimes is sufficient to cause the dynamic braking effect of the transmission to be overcome with the result that the motor component of the motor-pump transmission unit tends to drive the pump component thereof as well as the engine of the vehicle at speeds in excess of those for which such units are designed, and ultimately causing severe damage thereto.

A control system for hydrostatic transmissions directed to the above problems is disclosed in copending U. S. Pat. application Ser. No. 585,902 filed Oct. 11, 1966, now U.S. Pat. No. 3,398,531, and assigned to the same assignee as the present invention. The present invention constitutes a further improvement to such a control system.

It is an object of the present invention, therefore, to provide automatic overspeed control means for a hydrostatic transmission when the flow of power therethrough is reversed in direction from that of normal operation.

Another object is to provide in a hydrostatic transmission an overspeed control means coupled with means operable for providing feathering control of said transmission.

A further object is to provide in a hydrostatic transmission valving means selectively settable or pre-positionable to positions corresponding with the reverse, neutral and forward control positions established for a hydrostatic transmission whereby upon setting said valving means for such corresponding positions said valving means are operative when the flow of power through the transmission is reversed in direction from that of normal operation to prevent an excessive build-up of pressure and a detrimental overspeeding of such hydrostatic transmission resulting from such pressure increase, and which valving means is positionable with a minimum of effort.

A still further object is to provide in a hydrostatic transmission valving means operable to provide a plurality of functions including switching means to transfer the drive pilot pressure in the hydrostatic loop thereof in either the forward or reverse drive positions thereof to a single high pressure pilot relief valve, providing a hydraulic transmission neutral without the necessity of holding a manual override in a disengaged position, and accommodating a lower pressure pilot relief valve that functions in the circuit of the hydrostatic loop to retard or eliminate motor-pump and engine overspeed.

Another object is to provide in a hydrostatic transmission overspeed control means the operation of which is coordinated with other control means that are operative to selectively provide the reverse, neutral and forward drive control positions of said transmission.

The foregoing and other objects and features of the invention will become apparent as the disclosure is more fully made in the following detailed description of a preferred embodiment of the invention as illustrated in the accompanying sheets of drawing in which:

FIG. 1 is a diagrammatic view illustrating mechanical and fluid circuit features of a transmission embodying the present invention; and FIG. 2 is a generally sectional view, with portions thereof shown schematically, of the valving means employed in the hydrostatic transmission shown in the preceding view.

Referring now to the drawings, where there is presented a general representation of a portion of a hydrostatic transmission system of the type customarily incorporated in vehicles for propulsion thereof, 10 designates a fluid reservoir connected by a conduit or passage 11 with the inlet of a fluid supply pump 12 which may be driven by suitable means such as the engine indicated at 13. An outlet of pump 12 opens into a conduit 14 and the latter in turn connects with an inlet of a motor-pump unit indicated generally by reference numeral 15. This portion of the system supplies the charge or make-up fluid to the motor-pump unit from pump 12 and together with the outlet circuit of said unit is commonly referred to as the charge circuit. It will be understood, of course, that the pump component 15a thereof will be operatively connected to suitable driving means such as the engine or motive power of an associated vehicle (not shown) while the motor component 15b will be suitably connected to other equipment, such as the drive train of a vehicle (not shown) to drive said vehicle.

Since the motor-pump unit 15 is generally conventional, such, for example, as the hydraulically interconnected and back-to-back arranged motor-pump unit described in the Hann et al U. S. Pat. No. 3,126,707, no extensive elaboration of the details or construction thereof need be included herein. Conduit 14 connects into said motor-pump unit by way of a pair of conduits 16, 16a (FIG. 1) which connect into respective check valves 17, 17a of conventional construction while the outlet sides of the latter valves open into the respective conduits 18, 18a which, in turn, connect at one end thereof into the respective pilot-operated high pressure relief valves 19, 19a. The outlets of said high pressure relief valves are cross-connected by conduits 20a, 20 with the respective inlets of valves 19a, 19 so as to bypass a large flow of fluid therebetween upon opening of either one of these relief valves as a result of an excessively high pressure in the associated circuit. The opposite ends of conduits 18, 18a communicate with the kidney-shaped ports 21, 21a and 22, 22a of the respective pump and motor components of said unit, and additional conduits 23, 23a communicating with the respective kidney ports connect into opposite ends of a shuttle valve 24. Said shuttle valve, which is of conventional construction, may include a spool 24a having enlarged lands 25, 25a at opposite ends thereof, and centering springs 26, 26a whereby said piston is maintained centered when the transmission is operating in its neutral position. An outlet or discharge conduit 27 communicates with a chamber 28 formed between the opposite lands 25, 25a of said valve and which chamber upon operation of said valve is adapted to communicate with a respective one of conduits 23, 23a. When either of the conduits 23, 23a is subjected to high pressure, the spool 24a will be shifted connecting the discharge conduit 27 with the other of the conduits 23, 23a which will be at low pressure. The fluid exhausted through the conduit 27 is then utilized for cooling the pump-motor unit as illustrated in the aforementioned Hann et al patent.

It will be appreciated, of course, that valves 17, 17a and 19, 19a together with pump and motor kidney ports 21, 21a and 22, 22a and shuttle valve 24 may be fashioned as part of the motor-pump unit 15 whereupon many of the conduits designated as interconnecting these components may be constituted as fluid passages formed in the casing, housing or valve plate members rather than as separate or individual elements.

The swash plates 29, 29a of the respective motor and pump components of the unit 15 may be operatively connected for displacement by suitable means such as indicated schematically at 30, 30a with suitable servos and servo actuating means (not shown) for controlling the displaced positions of said plates according to well known principles of operation of such mechanisms. For purposes of simplification of the instant application such servo displacement control means as well as other components of the transmission system not particularly pertinent to the present invention are omitted, but since they are substantially identical to the disclosure in co-pending U. S. Pat. applications, Ser. No. 548,184, now U.S. Pat. No. 3,360,934, and Ser. No. 585,787, now U.S. Pat. No. 3,392,526, and assigned to the same assignee as the present invention, reference may be had thereto for a further and more comprehensive elaboration thereof.

Since the high pressure relief valves 19, 19a are identical and of conventional construction except for the remote pilot control thereof, only one thereof need be described in detail with comparable elements of the second such valve being designated by the same reference character plus the suffix a. As shown in FIG. 2, each such valve may include an outer sleeve-like body 31 threadably mounted in a bore 32 formed in a casing member such as 33 which may be constituted as a portion of the valve porting plate or center section of the motor-pump unit 15. Bore 32 has a portion 34 at the inner end thereof that slidably accommodates a head portion 35. The head portion 35 may be fitted with a fluid seal 36 to restrict flow of fluid therealong. A bore 37 in body 31 slidably receives a sleeve valve 38 which normally abuts a snap ring 39 mounted in an annular recess in bore 37. A spring 40 compressibly disposed between an end wall 41 of body 31 and an end wall 42 of sleeve valve 38 continuously urges said sleeve valve 38 into abutting contact with snap ring 39. A plurality of radial openings 43 in body 31 communicate with the conduit or passage 18 while the open end 44 of said body 31 communicates with the conduit or passage 20. An axially extending opening 45 in the closed end of body 31 communicates with the pilot control conduit 46, while a reduced section portion 47 of said opening provides a restricting orifice, and a similar restricting orifice opening 48 coaxially aligned therewith is provided in the closed end wall 42 of sleeve valve member 38.

Control conduits or passages 46, 46a communicate with a valve assembly indicated generally by the reference numeral 49. Additional conduit or passage 50 communicatively connected to said valve assembly 49 connects with a feathering-relief valve 52 the outlet of which connects into a conduit 53 that opens into valve assembly 49 by way of port 130. An outlet conduit or passage 54 connected to conduit 53 discharges or dumps into reservoir 10.

The high pressure pilot and mechanically overrideably controlled feathering and relief valve unit 52 may include an outer casing or body member 55 having a central bore 56 therethrough which slidably receives a pilot poppet element 57, and an adjustable seat element 58 which is threadably secured by suitable thread means such as 59 in said bore. Additional thread means 60 cooperate with a lock nut 61 whereby said adjustable seat element may be securely fixed in any one of a plurality of positions in the casing 55 in order to compensate for manufacturing deviations. A hexagonal projection 62 on seat element 58 may be provided to facilitate movement of said adjustable seat element while a threaded coupling 63 is provided to couple the conduit 50 to the valve unit 52. An outlet opening 64 communicates with the interior of bore 56 and is connected by suitable conventional means with the conduit 53.

One end of bore 56 is fashioned with an enlarged bore portion 65 that slidably accommodates a plunger-like stop member 66 having a spring guide pin or stud 67 extending from one face thereof and a rod or stem 68 extending from an opposite face of said stop. A stop guide 69 threadably mounted as by the threads 70 in the enlarged bore portion 65 has an axial opening 71 that slidably accommodates the rod or stem 68 therein. A fluid seal 72 may be provided for well known purposes in the end of stop guide 69. Pivotally coupled to stem 68 is a push-pull rod 73 the opposite end of which is pivotally connected at 74 to an arm 75 of a foot pedal member 76 pivotally mounted at 77 by suitable means to a fixed support such as a portion of an associated vehicle (not shown). A return spring 78 inter-connects the arm 75 also to the fixed support and as disposed constantly urges the pedal 76 to an up position and the stop 66 into engagement with the end wall 79 of enlarged bore portion 65. A spring 80 disposed between the poppet 57 and stop 66 normally urges said poppet into a position against the seat element 58 to restrict fluid flow therethrough. It will be noted a small axially extending space is provided between the ends of the poppet stem and the spring guide pin 67 so as to permit limited movement of the poppet without displacing the spring stop 66.

An axial opening 81 in seat element 58 has a reduced section portion 81a therein that provides a restricting orifice for purposes which will presently be understood.

It will be seen that as pedal 76 is depressed, spring stop 66 is displaced thereby relieving the compressive reaction of spring 80 and permitting the fluid pressure in 81a to force poppet 57 off its seat and dump fluid into the reservoir 10 by way of conduits 53 and 54.

In the valve assembly 49 there are two check valves and two low pressure relief valve. Two of the check valves 82 and 82a are identical. The check valve 82 includes a plug-like member 83 threadably mounted in a bore 84 formed in the valve body or casing 85. The valve body 85 may be separately fashioned or constitute a portion of the motor-pump unit 15. A reduced section extension 86 of member 83 has a transverse slot 87 extending therethrough. An axially extending bore 88 is formed in the plug-like member 83. The bore 88 slidably accommodates a ball element 90 which is urged outwardly therefrom by a spring 91. A fluid sealing ring 92 may be provided at the upper end of bore 84 to cooperate with member 83.

Since the check valve 82a is identical to check valve 82, no additional description need be provided. The parts thereof have been designated by identical reference characters plus the suffix a.

The low pressure relief valve 93 includes a plunger-like member 94 disposed in bore 84. A reduced section portion 95 of bore 84 receives a seat element 96 having a fluid sealing means 97 thereon and a central axially extending aperture 98 therethrough. A counterbore 99 is formed in the upper end of seat element 96. An axially extending bore 100 in the plunger-like member 94 accommodates a ball element 101 which is normally pressed against seat element 96 by a compression spring 102 disposed in bore 100. A central opening 103 is formed in the upper end of member 94 and is adapted to establish fluid communication between bore 100 and transverse slot 87 in the end of plug member 83. The upper portion of opening 103 forms a seat 104 for the ball element 90 of check valve 82, the spring 91 normally urging the ball element 90 into engagement with seat 104. Fluid sealing means 105 may be provided on the enlarged central portion of member 94 to establish a seal with the bore 84.

A second valve 93a substantially similar to valve 93 is shown to the right of valve 93 as viewed in FIG. 2. To the extent that it is similar, the ports thereof have been designated by identical reference characters plus the suffix a. In addition, valve 93a also includes upper lift pin 106a disposed in the bore 100a and within the spring 102a for lifting the ball element 90a and lower lift pin 107 for lifting the ball element 101a. The pin 107 is slidably disposed in a bore 108a and extends through the aperture 98a to contact ball element 101a. At its lower end pin 107 is adapted to contact a transversely extending spool valve as hereinafter more fully explained.

A passage 109 in the valve body 85 establishes fluid communication between the upper portion of bores 84 and 84a and the transverse slots 87 and 87a. A passage 110 in the valve body 85 further establishes fluid communication between the bore 84, transverse slots 87, bore 141, and conduit 50 communicating with feathering valve 52.

A passage 111 in the valve body 85 extending from one end thereof interconnects the lower ends of valves 93 and 93a and communicates with bore 141. The outer end of the passage 111 is sealed by a closure plug 112.

A passage 113 formed in the valve body 85 communicates with the bore 84 and with the bore 100 in the plunger-like member 94 through an opening 114 in the member 94. The conduit 46 communicates with the passage 113.

A passage 115 formed in the valve body 85 communicates with the bore 84a and with the bore 100a in the member 94a through an opening 114a in the member 94a. The conduit 46a communicates with the passage 115.

A bore 116 extends through the lower portion of the valve body 85 and slidably receives a spool valve member 117. One end of the spool 117 extends outwardly from one end of said bore and is operatively connected to a speed and direction of movement control means indicated schematically at 118. The opposite end of the bore 116 is closed by a closure plug 119 which may be threadably secured in the bore end.

The speed and direction of movement control means 118 may, for example, be of the type disclosed in copending U. S. Pat. applications, Ser. No. 562,888, now U.S. Pat. No. 3,389,556, and Ser. No. 589,895, now U.S. Pat. No. 3,387,454, assigned to the same assignee as the present invention. The speed and direction of movement control means 118 is operably connected to the spool member 117 so that actuation of means 118 is effective to correspondingly position spool member 117 to permit valve assembly 49 to perform the selected functions thereof as the transmission is conditioned for either forward, neutral or reverse movement of the vehicle.

The spool valve member 117 operates with its associated parts so that a minimum of effort is required to shift the member 117 to its several positions. A compression spring 120 surrounds the inner reduced section end of the spool member 117, being positioned between a first ring member 121 and second ring member 122 surrounding the spool member 117. The spring 120 urges the ring members in opposite directions along the spool 117. The movement of ring member 121 along the spool member 117 is limited by a shoulder stop 123 formed in the bore 116 and the outward movement of ring member 122 is limited by a snap ring 124 positioned at the end of the spool member. In the neutral position as shown in FIG. 1 the spring 120 is at its maximum extension. In that position the spring 120 urges ring member 121 against a shoulder 123 on the valve body and ring member 122 against a shoulder 126 formed in the closure plug 119. In a forward drive position, the spool member 117 is moved to the right as seen in FIG. 2 and in reverse drive position the spool member 117 is moved to the left.

An axially extending bore 127 is formed in the inner end of the spool member 117 and lateral passage means 128 and 129 extend through the spool 117 from the bore 127 whereby fluid received through a port 130 in fluid communication with conduit 53 may flow to the bore 116. This provides lubrication for the spool member 117.

Spool 117 is fashioned with a pair of conical or inclined surfaces 131 and 132 which flare outwardly from reduced sections 133 and 134 and toward each other to meet at the land 135. The section 134 is of a smaller diameter than section 133. Suitable sealing means 136 may be provided to prevent leakage from the valve body along spool 117.

The relatively enlarged land portion 137 of the spool member 117 slides in the bore 116 and is positioned on the spool to be effective to block communication between passage 108 and bore 116 when the spool is in a forward drive position. In the neutral or reverse position of the spool member 117 the land portion 137 does not block communication between passage 108 and bore 116.

The lift pin 107 slidably disposed in bore 108a is adapted to contact the reduced sections 133 and 134, the inclined surfaces 131 and 132 and the land 135 at one end. The opposite end of the lift pin 107 engages ball element 101a. In the neutral position, the lift pin 107 rides on land 135 and lifts the ball 101a from its seat 96a and the ball element 90a from its seat 104a through the upper lift pin 106a which rides on the ball 101a.

In the normal forward drive position, the lift pin 107 rides on reduced section 133 of the spool valve and is raised sufficiently to lift ball element 101a from its seat but not enough to move the upper lift pin 106a upwardly sufficiently to lift ball element 90a from its seat to open valve 82a.

In the reverse drive position, the lift pin 107 rides on reduced section 134 of the spool valve and in that position is not raised sufficiently to contact ball element 101a thus permitting spring 102a to hold the ball element 101a on its seat.

The springs 102 and 91 are designed to allow pressure build-up in passage 111 to allow the drive pump 15a of motor-pump unit 15 to drive the engine to a maximum amount of dynamic braking without detrimental overspeed to either the engine or the drive pump. The springs 102a and 91a are of low load and low rate and are used to positively seat ball elements 101a and 90a on their respective seats.

The valve assembly 49 also includes an anti-coast valve 139 which comprises spool valve 140 reciprocable in bore 141. The bore 141 intersects an extension of passage 111 so that fluid pressure in passage 111 can act against the bottom of spool valve 140. A port 142 in the valve body 85 and communicating with conduit 50 opens into bore 141, and the spool valve 140 in a raised position is adapted to block the port 142.

In the motoring condition, the motoring pressure acts on the underside of spool valve 140 and a reduced motoring pressure acts against the top, the pressure being reduced by the amount of the pressure drop across the check valve 82a. As the valve 140 shifts upwardly it closes off port 142 in the valve body 85 to which the conduit 50 is connected.

OPERATION

The supply pump 12 provides a charge fluid at a low pressure by way of conduit 14 to the motor-pump unit 15, and with said unit operating, the motor thereof being driven by fluid under pressure from the unit's drive pump, fluid is circulated around the transmission loop inter-connecting said motor and drive pump of the unit. Under this condition, the fluid in the high pressure side of this loop becomes effective for actuating shuttle valve 24, moving it away from its normally centered position with the transmission in neutral, and moving it to the right or left depending on the tilted or displaced position of the swash-plates in the motor-pump unit. At the same time, the low pressure or return side of said transmission loop operating at a lower pressure becomes effective to permit opening of the corresponding one of the check valves 17 or 17a to admit make-up or charge fluid from the respective one of the supply lines 16, 16a. With shuttle valve 24 open, conduit 27 serves to transfer fluid discharged thereinto from the motor-pump unit to other parts of the system for cooling and return to the fluid source. All of the above, of course, is the well known manner of operation for systems of this character. It will be understood that the tilt or displacement of the swash plates to provide forward, neutral or reverse positions of the transmission will be effected responsive to actuation of the speed and direction of movement control means 118.

Assume, initially, a neutral position whereupon the speed and direction of movement control means 118 will be in neutral and the valve spool 117 will be centered in its neutral position, as illustrated in FIG. 1. This being the case, the lift-valve pins 107 and 106a will have been moved upwardly to unseat the check valve 82a and check valve 93a thus permitting charge fluid from supply pump 12 to circulate by way of conduits 16, 16a, check vales 17, 17a, conduits 18, 18a, valves 19, 19a, and conduits 46, 46a through the valve 82a, passages 109 and 110 into conduit 50 to valve 52. In this instance since the charge pressure in conduit 50 is not sufficient to overcome spring 80 in the feathering valve 52 or the pedal return spring 78 the latter valve will remain closed. Under this condition since the open valves 82, 82a allow a short circuit of the hydrostatic loop, only that pressure build-up therein which results from the flow restriction of the main relief valve spool 19, 19a will be allowed. In the neutral condition both relief valves 19 and 19a are vented directly to the sump through open valves 82a and 93a, passages 111, 108 and opening 129, bore 127 and opening 128 in spool valve 117. This permits a minimum drive pressure build-up at valve 19 or 19a.

Next assume a normal forward drive position wherein speed and direction of movement control means 118 will be moved to a forward position and spool 117 will have been moved to the right as viewed in FIG. 2. This positioning of the spool 117 permits lift-valve pin 107 to drop into engagement with reduced spool section 133 thereby permitting the seating of ball 90a on its seat element 104a under the influence of spring 91a and permitting restricted flow around the ball element 101a into passage 111. The lift pin 107 is not dropped sufficiently to permit ball element 101a to seat, and, therefore, charge pressure from conduit 46a will communicate with passage 111. In this direction of movement position kidney ports 21a, 22a will be subjected to drive fluid pressure while kidney ports 21, 22 will be subjected to charge fluid pressure. Drive fluid pressure is then carried past high pressure relief valve 19a and by way of passage 20 into high pressure relief valve 19 where a pilot flow is permitted through the latter valve by way of orifice openings 48 and 47 and passage 45 into conduit 46 and low pressure relief valve 93. This pilot pressure then aids spring 102 in retaining ball 101 seated and, by way of port opening 114 in member 94 and central opening 103 displaces ball element 90 off its seat 104 in check valve 82. Thereupon this pilot pressure is carried by way of conduit 50 into the feathering valve 52. Since this pilot pressure ordinarily is not sufficient to unseat poppet 57 of the feathering valve, the latter valve will remain closed thus permitting pilot pressure to be maintained in the system.

In moving from neutral to a forward drive position, a sudden surge of pressure is developed by the pump. This ordinarily would be transmitted to the motor, but the motor is unable to transfer immediately such a force to a drive train for example, with which it is drivingly connected. To accommodate this excess pressure developed by the pump 15a, the increased pressure in conduit 18a bypasses relief valve 19a and via conduit 20 opens relief valve 19 by moving slide valve 38 to the left as viewed in FIG. 2 and dumping excess pressure to conduit 18 and the low pressure side of the hydrostatic loop. This dumping of excess pressure prevents damage to the motor unit. In addition, it also acts as a safety device to prevent jerking starts. It is known, for example, in some cases that sudden application of driving force to the drive train of a tractor is effective to swing the tractor upwardly on its rear drive wheels. The sudden application of force through a hydrostatic transmission in a tractor unit can have such a result unless positive means are used to absorb, restrain or otherwise reduce sudden surges of power which could be applied to the drive train of a vehicle. The high pressure relief valves 19 and 19a provide this safety factor by permitting excess fluid pressure to be diverted so that instead of passing directly from pump to motor, it bypasses the power path through the motor and is diverted to the discharge side of the motor.

With the direction of movement control element 118 disposed to provide reverse operation of the transmission, spool 117 will be axially disposed to the left to permit the lift-valve pin 107 to drop into engagement with reduced section 134. This will permit valve 93a to be closed. Kidney ports 21, 22 will then be subjected to drive fluid pressure while kidney ports 21a, 22a will be subjected to charge fluid pressure and valve 93 will be under pilot fluid pressure by way of conduit 46 with valve 93a being subjected to charge fluid pressure. The pilot fluid pressure in valve 93 will unseat ball 90 in check valve 82 and permit said pressure to communicate by way of passage 110 and conduit 50 with feathering valve 52. The feathering valve 52 then being subjected only to the pilot fluid pressure, the pilot poppet 57 will remain closed and the latter pressure maintained in the system. Any motoring pressure developing in the system and at valve 19 during reverse movement of the vehicle will be controlled by feathering valve 52.

In moving from neutral to reverse drive, much the same situation exists as in moving from neutral to forward drive, i.e., a sudden surge of fluid pressure is developed which must be dissipated in order to prevent damage to the transmission unit. In this case, the excess pressure is effective to open relief valve 19a by moving slide valve 38a to the right as viewed in FIG. 2.

When the vehicle is moving forwardly and coasting down an incline or is being push-loaded by a tractor or a wagon, the drive fluid pressure is switched from conduit 46 to conduit 46a because the drive motor 15b, of motor-pump unit 15, becomes the pumping element and the hydraulic drive pump 15a becomes the motoring element. As the motoring pressure, i.e., that being produced by motor 15b acting as a pump, builds up in kidney ports 22,21 the torque output of the normally driven pump 15a, acting as a motor, increases and tends to overspeed or overdrive the engine or vehicle power plant to a point of damaging both said normally driven drive pump and engine. However, since the low pressure relief valve 93 is preselected to have an unloading value that limits the pressure input to the normally driven pump 15a during motoring conditions, the torque output may be controlled and limited. This is accomplished in the following manner. Motoring fluid pressure is transferred from kidney ports 22,21 through the orifice 48a of high pressure relief valve 19a to conduit 46a and the open check valve 93a through which it passes into passage 111. Then the motoring pressure acts on low pressure relief valve 93 to unseat the ball 101 thereof and opening said valve 93 to thereby short circuit or by-pass a portion of the fluid flow between opposite sides of the hydrostatic loop. This short circuiting or by-passing action drops the pressure in conduit 46a permitting the motoring pressure to move slide valve 38a to the right to open or unload the main relief valve 19a which then by-passes the larger portion of the fluid flow to conduit 18 and the low pressure side of the loop thereby limiting overspeeding while still maintaining a condition wherein dynamic braking may be effectively utilized.

The motoring pressure is also effective to lift the ball element 90a from its seat in the check valve 82a. Motoring pressure reduced by a slight amount due to the pressure drop across check valve 82a is transferred to passage 109 and assists the spring 91 in holding the check valve 82 closed. The motoring pressure eventually will also lift ball element 90 from its seat 104 so that the pressure on the top and bottom of anti-coast valve spool 140 will become substantially equalized and thus permit the latter valve to assume its normal position in which it will not block port 142.

In the embodiment disclosed herein the motoring pressure will act on the underside of spool valve 140 and a reduced motoring pressure acts against the top, the pressure being reduced by the amount of the pressure drop across the check valve 82a. As the valve 140 shifts upwardly, it closes off port 142 in the valve thereby preventing movement of pressure fluid through conduit 50 to feathering and relief valve 52. Thus in a motoring condition during forward movement of the vehicle the anti-coast valve 139 is effective to prevent disengagement of the drive which might otherwise be effected by discharge of pressure fluid through feathering and relief valve 52 to create in effect a transmission neutral.

The anti-coast valve 139 in this embodiment is effective to operate only in the forward direction of movement. In reverse direction of movement motoring pressure in conduit 46 does not have access to anti-coast valve 139 or to a low pressure relief valve. Thus pressure build-up at relief valve 19 is controlled entirely by feathering and relief valve 52.

The high pressure pilot and mechanically overridable feathering and relief valve 52 provides feathering action during normal driving operation that is somewhat comparable to a clutch in that it permits the gradual opening and closing of the pressure side of the hydrostatic loop by selectively depressing and releasing pedal 76. This dumping type action permits disrupting the power flow from the hydraulic drive pump to the hydraulic drive motor in the hydrostatic loop which thereby removes driving torque from the wheels of the vehicle and eliminates dynamic braking. A similar feathering action may be automatically operative during normal driving operation upon development of excess pressure in the hydrostatic loop when such pressure becomes sufficiently high to open pilot poppet 57 against the reaction of spring 80 to dump fluid by way of conduit 53 to reservoir 10 without actuation of the pedal 76. Then upon release of the abnormal pressure, the circuit returns to normal. On the other hand, in event of an emergency, the pedal 76 may be rapidly depressed to quickly dump fluid to the reservoir to prevent excessive pressure build-up, thus providing a mechanical override for a high-pressure pilot valve for the drive pressure side of a hydrostatic transmission, thus constituting a safety feature for the device. The pedal 76 when depressed may also provide an additional neutral position for the transmission, because when so depressed, there can be no pressure build-up in the hydrostatic loop such as is necessary to effect a transmission of power through the motor-pump unit.

Thus it will be apparent that I have advantageously provided in a hydraulic system for controlling a hydrostatic transmission an arrangement for presetting valve means, remote from the high pressure valves of the system, said arrangement being mechanically actuated and adapted to be coordinated with the speed and direction of movement control means of the vehicle with which the transmission is associated. A low effort arrangement is provided for selectively setting the valve means in positions corresponding to forward, neutral and reverse drive positions, and the valve means are operable to control over-speeding of the transmission thereby reducing the possibility of damage thereto. The valve means are communicatively connected to a high pressure relief valve for dumping excess pressure to a reservoir source of fluid.

While a preferred embodiment has been shown for the purpose of illustrating the invention, it is to be understood that the invention is not limited thereto as other variations will be apparent to those skilled in the art and the invention is to be given its fullest possible interpretation within the terms of the following claims.

What is claimed is:

1. In a hydrostatic transmission having a variable displacement pump and motor hydraulically inter-connected to form a closed circuit for transmitting power therethrough, a reservoir source of fluid, and speed and direction of movement control means connected to at least one of said pump and motor and movable in opposite directions from a neutral position for controlling displacement to selectively produce forward and reverse direction of drive of said motor when the power flow is from the pump to the motor of said unit, the combination comprising:
   means to limit overspeeding of said transmission when the direction of the power flow through said transmission is reversed including a pair of high pressure pilot operated relief valves communicatively connected across said closed circuit and normally closed to fluid flow between opposite sides of said closed circuit but each of which is operable responsive to development of an excessive pressure therein for short-circuiting fluid flow between opposite sides of said circuit;
   low pressure valve means;
   high pressure pilot valve means;
   said low pressure valve means and high pressure pilot valve means being connected in series and communicatively interposed between said high pressure valves and said reservoir;
   check valve means;
   valve positioning means adapted to be operatively associated with the speed and direction of movement control means for prepositioning said check valve means into positions corresponding to the positions of said direction of movement control means;
   said low pressure valve means being operatively responsive, when the direction of drive of the motor is in the forward direction and the said direction of power flow through the transmission is reversed, to an increase of fluid pressure in said closed circuit for short-circuiting a portion of the fluid flow therein between opposite sides of said closed circuit and concomitant therewith opening one of the said high pressure pilot operated valves to effect a short-circuiting of the remainder of the fluid flow in said closed circuit between opposite sides thereof to disrupt the flow of power through said unit.

2. The combination of claim 1 wherein said check valve means includes first and second check valves disposed substantially in coaxial alignment with each other and prepositionable by said valve positioning means into a plurality of positions including, a neutral position wherein both of said check valves are open, another position corresponding to the forward direction of drive position of the said motor wherein one of said check valves is open and the other thereof is normally closed, and a further position corresponding to the reverse direction of drive position of the said motor wherein both of said check valves are normally closed.

3. The combination of claim 2 further including a third check valve interposed between said low pressure relief valve and said high pressure pilot valve means.

4. The combination of claim 1 further including anti-coast valve means arranged to block communication to said high pressure pilot valve means under predetermined pressure conditions in forward drive position when the direction of power flow through the transmission is reversed to thereby prevent overspeeding of the hydrostatic transmission motor.

5. The combination of claim 2 wherein said valve positioning means includes lift pin members associated with each of said first and second check valves, and a reciprocable cammed member for contacting one of said lift pin members whereby the opening of both of said check valves may be controlled in response to the positioning of said reciprocable cammed member.

6. The combination of claim 5 including spring biasing means associated with said reciprocable cammed member for biasing said cammed member toward a neutral position.

7. The combination of claim 5 including means associated with said reciprocable cammed member for allowing venting of said high pressure pilot operated relief valves to the reservoir only through said high pressure pilot valve means under certain conditions of motor drive and for allowing venting directly to the reservoir without passing through said high pressure pilot valve means under certain other conditions of motor drive.

8. The combination of claim 7 including means for allowing venting of said high pressure pilot operated relief valves only through said high pressure pilot valve means when the direction of motor drive is in a forward drive position and directly to the reservoir when the direction of motor drive is in a neutral or reverse drive position.

9. In a hydrostatic transmission having a pump and motor hydraulically interconnected to form a closed circuit for transmitting power therethrough, at least one of said pump and motor having a variable displacement, a reservoir source of fluid, and speed and direction of movement control means connected to said one of said pump and motor and movable in opposite directions from a neutral position for controlling displacement to selectively produce forward and reverse direction of drive of said motor when the power flow is from the pump to the motor of said unit, the combination comprising:
   means to limit overspeeding of said transmission when the direction of the power flow through said transmission is reversed including a pair of high pressure pilot operated relief valves communicatively connected across said closed circuit and normally closed to fluid flow between opposite sides of said closed circuit but each of which is operable responsive to development of an excessive pressure therein for short-circuiting fluid flow between opposite sides of said circuit;
   low pressure valve means;
   high pressure pilot valve means;

said low pressure valve means and high pressure pilot valve means being connected in series and communicatively interposed between said high pressure valves and said reservoir;

check valve means;

valve positioning means adapted to be operatively associated with the speed and direction of movement control means for prepositioning said check valve means into positions corresponding to the positions of said direction of movement control means;

said low pressure valve means being operatively responsive, when the direction of drive of the motor is in the forward direction and the said direction of power flow through the transmission is reversed, to an increase of fluid pressure in said closed circuit for short-circuiting a portion of the fluid flow therein between opposite sides of said closed circuit and concomitant therewith opening one of the said high pressure pilot operated valves to effect a short-circuiting of the remainder of the fluid flow in said closed circuit between opposite sides thereof to disrupt the flow of power through said unit.

10. The combination of claim 9 wherein said check valve means includes first and second check valves disposed substantially in coaxial alignment with each other and prepositionable by said vale positioning means into a plurality of positions including, a neutral position wherein both of said check vales are open, another position corresponding to the forward direction of drive position of the said motor wherein one of said check valves is open and the other thereof is normally closed, and a further position corresponding to the reverse direction of drive position of the said motor wherein both of said check valves are normally closed.

11. The combination of claim 10 further including a third check valve interposed between said low pressure relief valve and said high pressure pilot valve means.

12. The combination of claim 9 further including anti-coast valve means arranged to block communication to said high pressure pilot valve means under predetermined pressure conditions in forward drive position when the direction of power flow through the transmission is reversed to thereby prevent overspeeding of the hydrostatic transmission motor.

13. The combination of claim 10 wherein said valve positioning means includes lift pin members associated with each of said first and second check valves, and a reciprocable cammed member for contacting one of said lift pin members whereby the opening of both of said check valves may be controlled in response to the positioning of said reciprocable cammed member.

14. The combination of claim 13 including spring biasing means associated with said reciprocable cammed member for biasing said cammed member toward a neutral position 15. The combination of claim 13 including means associated with said reciprocable cammed member for allowing venting of said high pressure pilot operated relief valves to the reservoir only through said high pressure pilot valve means under certain conditions of motor drive and for allowing venting directly to the reservoir without passing through said high pressure pilot valve means under certain other conditions of motor drive.

16. The combination of claim 15 including means for allowing venting of said high pressure pilot operated relief valves only through said high pressure pilot valve means when the direction of motor drive is in a forward drive position and directly to the reservoir when the direction of motor drive is in a neutral or reverse drive position.

17. A control system for a transmission having hydraulic pump and motor units, said pump unit being adapted for connection to a power input means and said motor unit adapted for interconnection to a power output means, with hydraulic interconnections between said pump and motor units for transmitting power to obtain forward and reverse output from said motor, and conditioning means for selecting forward or reverse drive, the improved control system comprising:

a. control valve means for limiting power flow from said motor to said pump so as to preclude overspeed conditions of the power input means or the transmission when said transmission is conditioned for forward drive and for permitting limited but higher power flow from said motor to said pump when said transmission is conditioned for reverse drive.

18. An apparatus as recited in claim 17 in which said control valve means comprises:

a. relief valves in said hydraulic interconnections and adapted to transfer fluid flow between said interconnections upon actuation, b. low pressure valve means associated with one of said relief valves and effective to actuate said one relief valve at a reduced pressure upon excessive power flow from said motor to said pump, c. the other relief vale being normally actuated only by system pressure.

19. An apparatus as recited in claim 17 in which:

a. feathering control valve means are associated with said hydraulic interconnections for interrupting power flow from said pump to said motor.

20. A control system for a transmission having hydraulic pump and motor units, a fluid circuit including pressure and return conduits, and relief valves inter-connecting said conduits for normally precluding flow between said conduits and means for controlling the displacement direction of flow from said pump, the improvement comprising:

a. valve means associated with said relief valves for controlling their actuation and including, b. first valve means conditioned by a control member for opening one of said relief valves at a reduced pressure upon power flow from said motor to said pump, and c. said other relief valve adapted to be normally actuated by system pressure, and d. means for connecting both conduits to each other upon movement of a control member to a neutral position.

21. In a transmission having a pump and motor units defining a hydrostatic loop, a pair of high pressure pilot relief valves interconnecting said units and capable of completely short-circuiting said loop, the improvement comprising:

supply and return conduits connected with said pilot valves and capable of at least partially short-circuiting said loop, low pressure relief valve means in said conduits for limiting the power flow from the motor to the pump when the transmission is conditioned for forward drive, and a feathering and relief valve associated with said conduits for limiting the power flow from the motor to the pump when the transmission is conditioned for reverse drive;

whereby dynamic braking is obtained during motoring of the transmission when conditioned for forward drive and higher dynamic braking is obtainable during motoring of the transmission when conditioned for reverse drive.

22. In a transmission according to claim 21 and further comprising:

a reservoir;

means for connecting both of said conduits to the reservoir when said transmission is conditioned for neutral so as to establish a positive neutral.

23. In a transmission according to claim 21 and further comprising:

anticoast valve means capable of rendering said feathering and relief valve means ineffective when the transmission is conditioned for forward drive and the units are motoring.

24. In a transmission according to claim 21 and further comprising:

manually operable means associated with said feathering and relief valve for variably controlling the pressure setting of said low pressure relief valve means and the power transfer from the pump to the motor when the transmission is conditioned for forward drive.

* * * * *